Sept. 5, 1933.                G. L. DILLMAN                1,925,138
                            GYROSCOPIC COMPASS
                         Filed Feb. 20, 1926       2 Sheets-Sheet 1
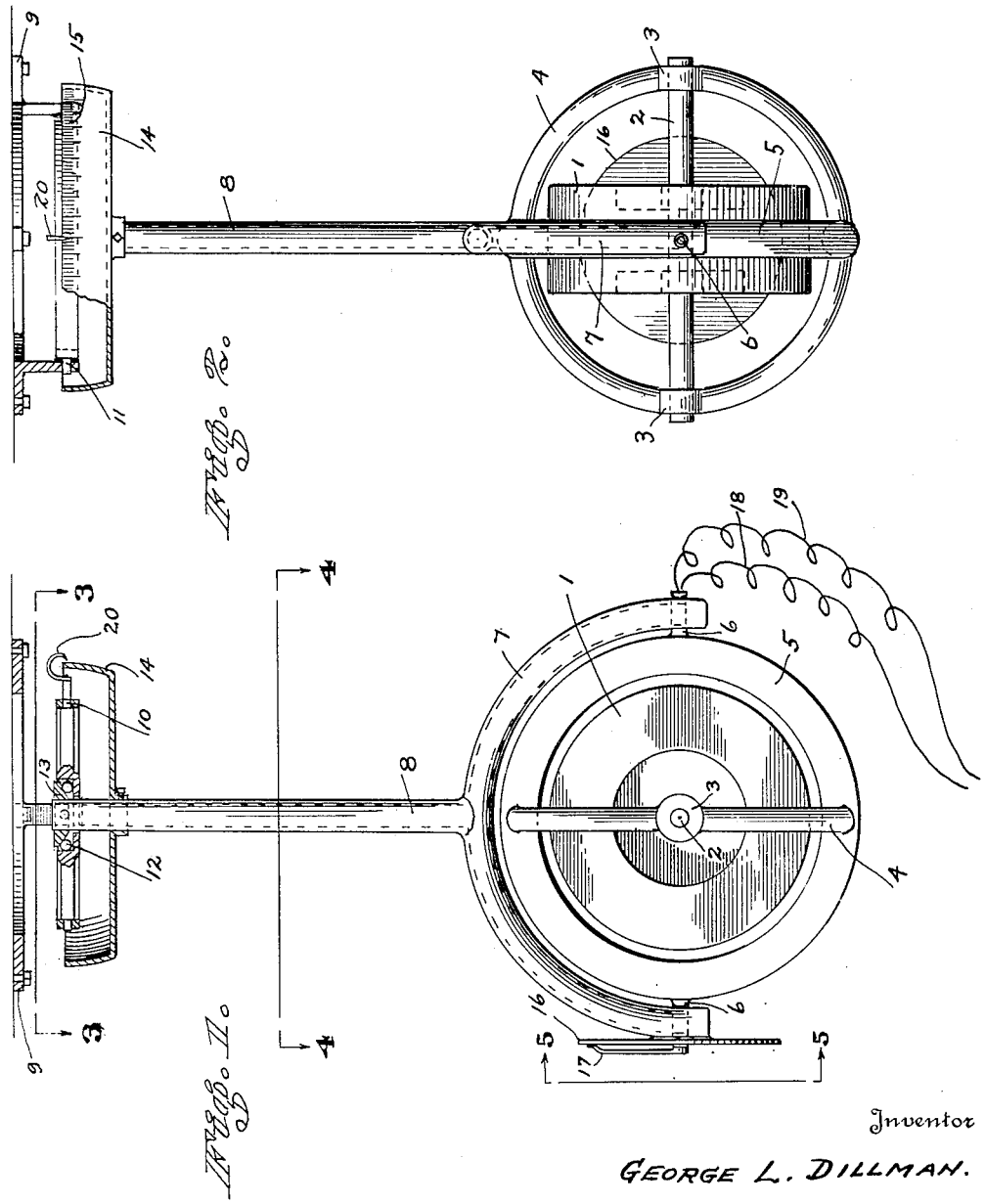
Inventor
GEORGE L. DILLMAN.
By Miller & Boyken
Attorneys Sept. 5, 1933.        G. L. DILLMAN        1,925,138
GYROSCOPIC COMPASS
Filed Feb. 20, 1926        2 Sheets-Sheet 2
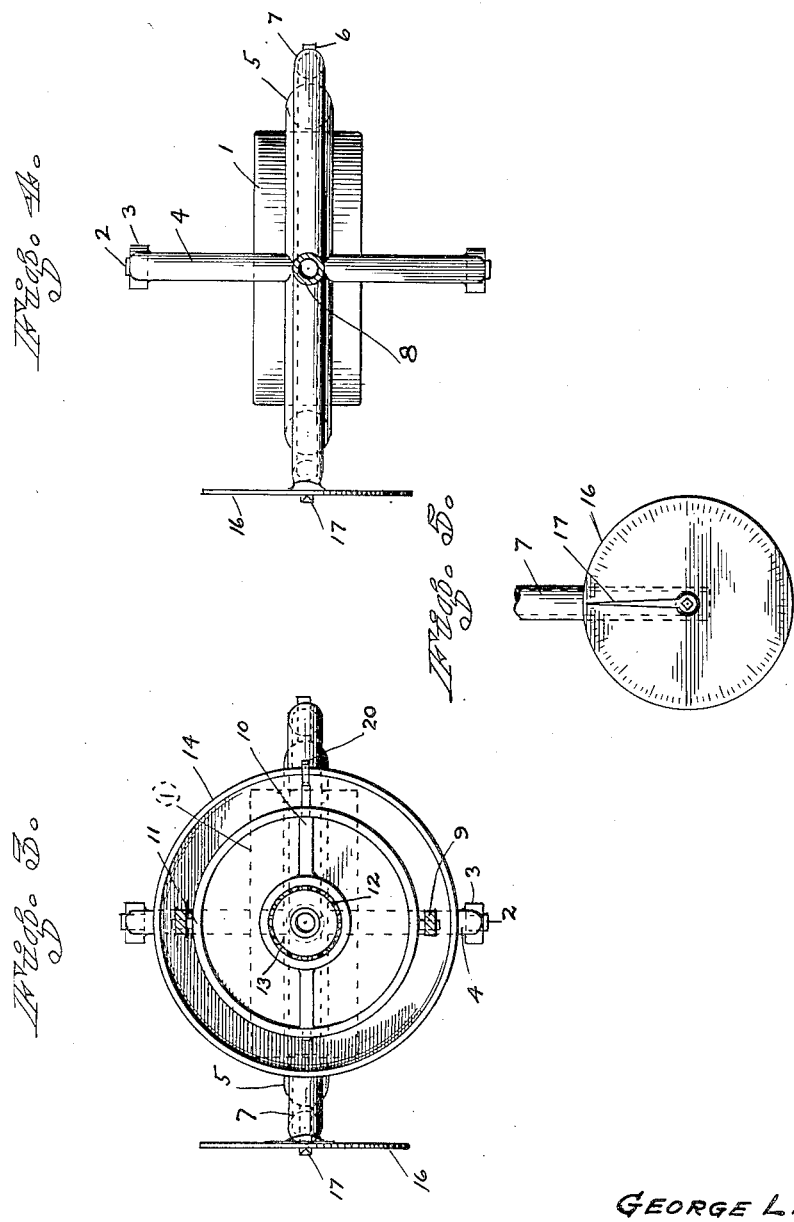
Inventor
GEORGE L. DILLMAN.
By Miller & Boyken
Attorneys Patented Sept. 5, 1933

1,925,138

UNITED STATES PATENT OFFICE 1,925,138

GYROSCOPIC COMPASS

George L. Dillman, San Francisco, Calif.; Mary A. W. Dillman, executrix of said George L. Dillman, deceased, assignor of one-half to Wallace Dillman, Los Angeles, Calif., and one-half to Alfred G. Zimermann, Norfolk, Va.

Application February 20, 1926. Serial No. 89,557

5 Claims. (Cl. 33—226)

This invention relates to gyroscope compasses and has for its objects a compass of this character which will be of simple construction, free from the common faults of such compasses, and which will while recording a given direction also record the latitude of the place at which the observations are made.

The invention of this compass is but one application of a law of motion which may be expressed as follows:—

When a spinning body is rotated about any axis, the body will tend to seek a position of stability with its axis parallel to the rotation axis and the direction of spin the same as the direction of rotation.

From this law, it follows that if a gyroscopic wheel free for unrestrained movement in every direction, be maintained in rotation it will, through its revolution around the earth's axis seek a position of stability with its axis of rotation parallel with the earth's axis, and if started with retrograde rotation will automatically invert its axis making rotation positive and finally reaching the position of stability above defined.

This being the case, such a gyroscopic wheel will always revolve in a plane perpendicular to the axis of the earth and the axis of rotation of the wheel will always indicate in azimuth north and south.

Also, it should be observed, since the plane of rotation is always perpendicular to the axis of revolution the relative tilt of the axis or plane of rotation to a vertical line will accurately indicate the latitude of the wheel's position on the earth.

Such a compass would have no inherent error to be compensated for such as the errors due to restraint imposed on the ordinary gyroscope compass against complete freedom in space, and would in consequence always indicate both direction and latitude accurately without compensation of any kind.

It is of course manifest that various forms of instruments may be made to operate through this law and function as a gyroscopic compass, and the single embodiment shown in the accompanying drawings is for the purpose of complying with the U. S. patent law without in any way limiting myself to such specific embodiment as it is my intention that the scope of the invention be determined by the claims hereunder.

The drawings show in Figure 1 a side elevation of the gyroscopic wheel carried in rings on a shaft suspended on gimbals from a fixed overhead bracket, the upper members being shown in cross section.

Figure 2 is a side view of Figure 1.

Figure 3 is a view of Figure 1 as seen from the line 3—3 thereof.

Figure 4 is a view of Figure 1 as seen from the line 4—4 thereof.

Figure 5 is an enlarged view of the latitude indicator as seen from the line 5—5 of Figure 1.

In the drawings 1 represents a gyroscopic wheel mounted on an axle 2 rotatably supported in bearings 3 carried on a ring 4 projecting at right angles from a ring 5 lying in the plane of the wheel 1 and in turn supported on trunnions 6 carried by an inverted yoke 7 extending from the lower end of a vertical shaft 8.

The shaft 8 is in turn suspended from a fixed bracket 9 in practice secured to some rigid part of a ship, and the shaft is perfectly free for both universal swinging movement on a pair of gimbals 10 and 11 lying in one plane at right angles to one another as well as revolving movement on a ball bearing 12 carried on the inner gimbal 10, the shaft being hung on this bearing by means of a cone 13 secured to the upper end thereof.

Thus it will be seen that the shaft is free to hang vertically within limits of the tipping motion of a ship, and the gyroscope wheel 1 is free to maintain any angular position whatever in space.

To the upper end of the shaft 8 is secured a ring 14 graduated as at 15 in any manner desired either in degrees or points as in an ordinary mariner's compass, and extending from the fixed bracket 9 or better from the pivot of inner gimbal 10 is a pointer 20 adapted to indicate the divisions in the revolution of the shaft 8, or rather in the revolution of the ship around the shaft since in operation the shaft will not revolve in space.

It is apparent that the indicating point and scale should coincide on a line with the axes of the gimbals 10 and 11, and also that it is optional whether the pointer or scale be carried by the shaft.

To indicate the latitude a graduated disk 16 and pointer 17 are similarly carried by the yoke 7 and one of the trunnions 6.

This disk of course need be but a half circle and if the disk is graduated in degrees it will at all times indicate the degrees of latitude, it being understood that the usual use of verniers is contemplated for fine readings.

The rotation of the wheel 1 is to be maintained by any of the well known means including electrical, fluid pressure etc. applied to gyroscope propulsion and not specifically entering this invention, but for illustrative purposes I assume the drive to be electrical, the current following the wires 18 and 19 through one or both of the trunnions 6, or through the hollow shaft 8 and the trunnions, to the ring 5 which is the field ring of the armature embodied in the wheel 1.

Thus upon simply starting the gyroscope wheel 1, if the motion is retrograde with respect to the earth's rotation it will reverse itself on its rings to a condition of stability as expressed in the law above stated, and the device will maintain its fixed position relative to the earth's axis at all points on the earth.

I claim:

1. In a gyro-compass, the combination of a supporting medium; a rotatable element suspended for universal swinging movement from said medium; indicating means adapted to indicate the relation of said element to said medium; a second rotatable element comprising a cage composed of two rings so disposed that their planes form an angle of 90°, having one of its rings journaled in said first rotatable element; indicating means adapted to indicate the relation of the two rotatable elements; and a third rotatable element journaled in the other ring of the second rotatable element.

2. In an indicating device, the combination of a fixed bracket; a rotatable pendulum suspended from said bracket; a pointer on said bracket; an indicator plate on said pendulum adapted to co-act with said pointer to indicate the relation of said pendulum to said bracket; a ring rotatably mounted on said pendulum; a second ring mounted on said first ring, concentric therewith and in a plane at right angles to the plane of the first ring; and a rotor journaled in said second ring.

3. In an indicating device, the combination of a fixed bracket; a rotatable pendulum suspended from said bracket; a pointer on said bracket; an indicator plate on said pendulum adapted to co-act with said pointer to indicate the relation of said pendulum to said bracket; a ring rotatably mounted on said pendulum; a second indicator plate on said pendulum; a pointer on said ring adapted to co-act with the second indicator plate on said pendulum to indicate the relation of said ring to said pendulum; a second ring mounted on said first ring, concentric therewith and in a plane at right angles to the plane of the first ring; and a rotor journaled in said second ring.

4. In an indicating device, the combination of a fixed bracket; a shaft; a collar loosely about said shaft and suspended from said bracket for universal swinging movement; a second collar fast on said shaft and supported by the first collar; an indicator plate mounted on said shaft; an indicator pointer mounted on said bracket and so disposed as to co-act with said plate; a yoke on the lower end of said shaft and having aligned bearings; trunnions in said bearings; an indicator plate mounted on one end of said yoke; an indicator pointer mounted on one of said trunnions and so disposed as to co-act with the plate on the yoke; a ring carried by said trunnions; and a rotor mounted in said ring with its axis of rotation disposed at right angles to the axis of said trunnions.

5. In an indicating device, the combination of a fixed bracket; a pair of gimbals depending from said bracket; a ball race mounted in said gimbals; a cone member rotatably supported in said race; a shaft depending from said cone; an indicator plate mounted on said shaft; an indicator pointer mounted on said bracket and so disposed as to co-act with said plate; a yoke on the lower end of said shaft and having aligned bearings to define a horizontal axis; trunnions in said bearings; an indicator plate mounted on one end of said yoke coaxial with said horizontal axis; an indicator pointer mounted on one of said trunnions and so disposed as to co-act with the plate on the yoke; a ring carried by said trunnions; and a rotor mounted in said ring with its axis of rotation disposed at right angles to and passing through the axis of said trunnions.

GEORGE L. DILLMAN.